United States Patent Office 3,663,517
Patented May 16, 1972

3,663,517
PREPARATION OF AROMATIC POLYAMIDES BY INTERFACIAL POLYCONDENSATION
Teruho Adachi, Takarazuka-shi, Japan, assignor to Sumitomo Chemical Co., Ltd., Osaka, Japan
No Drawing. Filed Oct. 1, 1970, Ser. No. 77,336
Claims priority, application Japan, Oct. 1, 1969, 44/78,862
Int. Cl. C08g 20/22
U.S. Cl. 260—78 R                                    7 Claims

ABSTRACT OF THE DISCLOSURE

A process for producing aromatic polyamides having a high molecular weight, which comprises reacting an aromatic diamine with a dicarboxylic acid halide in the presence of an acetophenone compound by means of interfacial polycondensation.

BACKGROUND OF THE INVENTION

Field of the invention

This invention relates to a process for producing aromatic polyamides.

Description of the prior art

In the preparation of aromatic polyamides having amide groups directly bonded to the aryl nucleus, the melt-polycondensation method is seldom carried out, because of the low reactivity of the amine and carboxyl groups of the monomers and their high melting point. Accordingly, aromatic polyamides are produced by an interfacial polycondensation in which an organic phase containing the aromatic dicarboxylic acid halide and an aqueous phase containing the aromatic diamine are subjected to dehydrohalogenation at their interface.

The yields and the degrees of polymerization are greatly affected by the organic solvents which dissolve the dicarboxylic acid halides. The conventional processes have resulted either in low yields or in low molecular weights in most cases. The report of Ogata et al. in The Journal of Polymer Science, vol. 61, page S 49, 1962, discloses that by using benzene, chloroform carbon tetrachloride, dimethyl formamide and other ordinary organic solvents, low-molecular-weight polymers ($(\eta)=0.2$–$0.3$) are obtained, and only cyclohexanone leads to a satisfactory degree of polymerization ($(\eta)$=about $0.6$) but with an insufficient yield of polymer.

SUMMARY OF THE INVENTION

More particularly, this invention provides a process for producing aromatic polyamides, which comprises reacting an aromatic diamine with a dicarboxylic acid halide in the presence of an acetophenone compound as a medium represented by the Formula I,

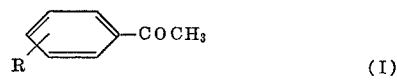

(I)

wherein R is a hydrogen atom or a $C_{1-3}$ alkyl group.

DESCRIPTION OF THE PREFERRED EMBODIMENTS

Thus, the present inventor has found that by using the acetophenone compound having the Formula I as a solvent for dissolving the dicarboxylic acid halide, thermally stable aromatic polyamides with a degree of polymerization comparable to that attained with the use of cyclohexanone as the solvent can be obtained in yields as high as 85% or above. This is considered to be attributable to the fact that the basicity of the aromatic amine is increased by the interaction of the carbonyl groups of the solvent and the amine, and the reactivity of the amino group is therefore increased.

Examples of the useful dicarboxylic acid halides include dibasic acid chlorides, such as phthaloyl chloride, isophthaloyl chloride, methyl-substituted isophthaloyl chloride, terephthaloyl chloride, 2,6-naphthalene dicarboxylic acid chloride and mixtures thereof.

Examples of the aromatic diamines include o-, m-, p-phenylene diamine, mixtures thereof, benzidine, dianisidine, 4,4'-diaminodiphenyl methane, 4,4'-diaminodiphenyl ether, 4,4'-diiaminodiphenyl sulfone, 4,4'-diaminodiphenyl sulfoxide, 3,3'-diaminodiphenyl sulfone, 4,4'-diaminostilbene, 1,5-diaminonaphthalene, 2,4-azobenzene, 3,6-acridine, 2,4-diaminotoluene and 3,5-diamino-1-chlorobenzene.

The dicarboxylic acid halide is dissolved in the acetophenone compound having the Formula I and the solution is mixed with an aqueous solution of the aromatic diamine to be subjected to interfacial polycondensation.

The concentration of the dicarboxylic acid halide and the aromatic diamine varies from 0.01 to 0.5 mole per liter of the solvents, preferably 0.2 to 0.3 mole/liter.

A surface active agent such as alkylbenzenesulfonic acids may be present in the reaction system during polymerization. The reaction temperature may be above room temperature, but preferably in the range of 5 to 15° C. There is no need to avoid air in the atmosphere of the reaction.

According to the present invention in which the compounds of the general Formula I are used as the solvent, the yields of polymers are better than in conventional interfacial polycondensation reactions, and the molecular weights of the polymers are higher. The physical properties of the aromatic polyamides obtained vary depending upon the types of monomers used, but these polyamides generally have a high melting point. The aromatic polyamides prepared may be used as thermally stable films and fibers.

The invention will be further described by the following examples which are presented for illustrative, rather than limitative, purposes.

EXAMPLE 1

In 200 cc. of water were dissolved 1.622 g. (0.015 mol) of metaphenylene diamine, 1.200 g. (0.3 mol) of sodium hydroxide and 0.233 g. of sodium dodecylbenzenesulfonate as a surface active agent, and the temperature of the resulting solution was maintained at 10–11° C. with the use of a water bath. A solution of 3.045 g. (0.015 mol) of isophthaloyl chloride in 100 cc. of a mixture of 55% meta-methyl acetophenone and 45% paramethyl acetophenone, previously prepared and maintained at 10° C., was added to the aqueous phase under vigorous stirring. Because of the heat of reaction, the temperature of the solution rose to 14.5° C. Stirring was conttinued for one hour to form a precipitate of polymer. After completion of the reaction, the polymer was separated by filtration, washed with water, ethanol, benzene and acetone successively, and dried under vauum.

Thus, 3.499 g. of a white powder of a polymer was obtained in a yield of 98%.

The intrinsic viscosity of the polymer, as measured in 0.25% concentrated sulfuric acid solution at 25° C., was 0.59. The decomposition point of the polymer, as measured by differential thermal analysis, was above 380° C.

For the purposes of comparison, the same procedure as set forth above was repeated except that chloroform was used as the solvent. A polymer having an intrinsic viscosity of 0.23 was obtained in 81% yield. As is clear from these results, the use of methyl acetophenones as the solvent gives a marked increase both in the yield and molecular weight of the polymer.

EXAMPLE 2

In 200 cc. of water were dissolved 0.811 g. (0.0075 mol) of metaphenylene diamine, 0.600 g. (0.015 mol) of sodium hydroxide and 0.117 g. of sodium dedecylbenzenesulfonate as a surface active agent, and the temperature of the resulting solution was maintained at 9–10° C. with the use of a water bath. A solution of 1.523 g. (0.0075 mol) of isophthaloyl chloride in 100 cc. of a mixture of 55% metamethyl acetophenone and 45% paramethyl acetophenone, previously prepared and maintained at 10° C., was added to the aqueous phase under vigorous stirring. Because of the heat of reaction, the temperature of the solution rose to 11.5° C. Stirring was continued for one hour to form a precipitate of polymer. After completion of the reaction, the polymer was separated by filtration, washed with water, ethanol, benzene and acetone successively, and dried under vacuum.

Thus, 1.509 g. of a white powder of a polymer was obtained in a yield of 85%.

The intrinsic viscosity of the polymer, as measured in a 0.25% concentrated sulfuric acid solution at 25° C., was 0.61. The decomposition point of the polymer, as measured by differential thermal analysis, was above 380° C.

EXAMPLE 3

In 100 cc. of water were dissolved 0.811 g. (0.0075 mol) of metaphenylene diamine, 0.600 g. (0.015 mol) of sodium hydroxide and 0.117 g. of sodium dodecylbenzenesulfonate as a surface active agent, and the temperature of the resulting solution was maintained at 10–11° C. with the use of a water bath. A solution of 1.523 g. (0.0075 mol) of isophthaloyl chloride in 100 cc. of a mixture of 55% metamethyl acetophenone and 45% paramethyl acetophenone, previously prepared and maintained at 10° C., was added to the aqueous phase under vigorous stirring. Because of the heat of reaction, the temperature of the solution rose to 13° C. Stirring was continued for one hour to form a precipitate of polymer. After completion of the reaction, the polymer was separated by filtration, washed with water, ethanol, benzene and acetone successively, and dried under vacuum.

Thus, 1.647 g. of a white powder of a polymer was obtained in a yield of 92%.

The intrinsic viscosity of the polymer, as measured in a 0.25% concentrated sulfuric acid solution at 25° C., was 0.67. The decomposition point of the polymer, as measured by differential thermal analysis, was above 380° C.

EXAMPLE 4

In 100 cc. of water were dissolved 0.974 g. (0.009 mol) of metaphenylene diamine, 0.800 g. (0.020 mol) of sodium hydroxide and 0.156 g. of sodium dodecylbenzenesulfonate as a surface active agent, and the temperature of the resulting solution was maintained at 9–11° C. with the use of a water bath. A solution of 2.030 g. (0.01 mol) of isophthaloyl chloride in 100 cc. of a mixture of 55% metamethyl acetophenone and 45% paramethyl acetophenone, maintained at 10° C., was added to the aqueous phase under vigorous stirring. Because of the heat of reaction, the temperature of the solution rose to 14° C. Stirring was continued for one hour to form a precipitate of polymer. After completion of the reaction, the polymer was separated by filtration, washed with water, ethanol, benzene, and acetone successively, and dried under vacuum.

Thus, 1.760 g. of a white powder of a polymer was obtained in a yield of 86.1% (based on the metaphenylene diamine).

The intrinsic viscosity of the polymer, as measured in a 0.25% concentrated sulfuric acid solution at 25° C., was 0.71. The decomposition point of the polymer, as measured by differential thermal analysis, was above 380° C.

EXAMPLE 5

In 100 cc. of water dissolved 1.081 g. (0.01 mol) of metaphenylene diamine, 0.800 g. (0.02 mol) of sodium hydroxide and 0.156 g. of sodium dodecylbenzenesulfonate as a surface active agent, and the temperature of the resulting solution was maintained at 9–10° C. with the use of a water bath. A solution of 2.030 g. (0.01 mol) of isophthaloyl chloride in 100 cc. of acetophenone, previously prepared and maintained at 10° C., was added to the aqueous phase under vigorous stirring. Because of the heat of reaction, the temperature of the solution rose to 14.2° C. Stirring was continued for one hour to form a precipitate of polymer. After completion of the reaction, the polymer was separated by filtration, washed with water, ethanol, benzene and acetone successively, and dried under vacuum.

Thus, 2.275 g. of a white powder of a polymer was obtained in a yield of 95.5%.

The intrinsic viscosity of the polymer, as measured in a 0.25% concentrated sulfuric acid solution at 25° C., was 0.58. The decomposition point of the polymer, as measured by differential thermal analysis, was above 380° C.

EXAMPLE 6

The procedure of Example 1 was repeated except that metamethyl acetophenone was used in place of the mixture of 55% metamethyl acetophenone and 45% paramethyl acetophenone, and 3.461 g. of a white powder of a polymer was obtained in a yield of 97%.

The intrinsic viscosity of the polymer, as measured in a 0.25% concentrated sulfuric acid solution at 25° C., was 0.65. The decomposition point of the polymer, as measured by differential thermal analysis, was above 380° C.

EXAMPLE 7

The procedure of Example 1 was repeated except that paramethyl acetophenone was used in place of the mixture of 55% metamethyl acetophenone and 45% paramethyl acetophenone, and 3.395 g. of a polymer was obtained in a yield of 95%.

The intrinsic viscosity of the polymer, as measured in a 0.25% concentrated sulfuric acid solution at 25° C., was 0.56. The decomposition point of the polymer, as measured by differential thermal analysis, was above 380° C.

What is claimed is:

1. In a process for the production of aromatic polyamides by the reaction of an aqueous phase containing an aromatic diamine with an organic phase containing a dicarboxylic acid halide by means of interfacial polycondensation, the improvement which comprises using as the organic solvent an acetophenone compound represented by the formula,

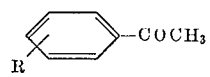

wherein R is a hydrogen atom or an alkyl group of 1 to 3 carbon atoms.

2. A process according to claim 1, wherein the acetophenone compound is acetophenone, metamethyl acetophenone, paramethyl acetophenone or a mixture thereof.

3. A process according to claim 1, wherein the aromatic diamine is o-, m-, or p-phenylene diamine, a mixture thereof, benzidine, dianisidine, 4,4'-diaminodiphenyl methane, 4,4'-diaminodiphenyl ether, 4,4'-diaminodiphenyl sulfone, 4,4'-diaminodiphenyl sulfoxide, 3,3'-diaminodiphenyl sulfone, 4,4'-diaminostilbene, 1,5-diaminonaphthalene, 2,4-azobenzene, 3,6-acridine, 2,4-diaminotoluene, and 3,5-diamino-1-chlorobenzene.

4. A process according to claim 1, wherein the dicarboxylic acid halide is phthaloyl chloride, isophthaloyl chloride, methyl-substituted isophthaloyl chloride, terephthaloyl chloride, 2,6-naphthalene dicarboxylic acid chloride or a mixture thereof.

5. A process according to claim 1, wherein the concentration of the aromatic diamine in said aqueous phase is 0.01 to 0.5 mole per liter of water.

6. A process according to claim 1, wherein the concentration of the dicarboxylic acid halide in said organic phase is 0.01 to 0.5 mole per liter of the acetophenone compound.

7. A process according to claim 1, wherein the reaction is conducted at a temperature of 5°–15° C.

References Cited
UNITED STATES PATENTS

| | | | |
|---|---|---|---|
| 3,232,910 | 2/1966 | Preston | 260—78 |
| 3,324,086 | 6/1967 | Preston | 260—78 |
| 3,354,120 | 11/1967 | Bach et al. | 260—47 |
| 3,354,125 | 11/1967 | Smith et al. | 260—78 |
| 3,376,268 | 4/1968 | Preston | 260—78 |
| 3,376,269 | 4/1968 | Preston | 260—78 |

WILLIAM H. SHORT, Primary Examiner

L. L. LEE, Assistant Examiner

U.S. Cl. X.R.

260—47 CZ